United States Patent
Prat et al.

(10) Patent No.: US 10,216,623 B2
(45) Date of Patent: Feb. 26, 2019

(54) METHOD FOR VERIFYING THE FUNCTIONALITIES OF A SOFTWARE INTENDED TO BE INTEGRATED INTO A CRYPTOGRAPHIC COMPONENT, SYSTEM

(71) Applicant: AIRBUS DS SLC, Elancourt (FR)

(72) Inventors: Julien Prat, Paris (FR); Fany Vetu, Issy-les-Moulineaux (FR)

(73) Assignee: AIRBUS DS SLC, Elancourt (FR)

( * ) Notice: Subject to any disclaimer, the term of this patent is extended or adjusted under 35 U.S.C. 154(b) by 49 days.

(21) Appl. No.: 15/381,773

(22) Filed: Dec. 16, 2016

(65) Prior Publication Data
US 2017/0177467 A1    Jun. 22, 2017

(30) Foreign Application Priority Data

Dec. 18, 2015  (FR) ..................................... 15 62841

(51) Int. Cl.
| | |
|---|---|
| *G06F 11/36* | (2006.01) |
| *G06F 11/26* | (2006.01) |
| *G06F 11/28* | (2006.01) |
| *G06F 21/72* | (2013.01) |

(52) U.S. Cl.
CPC ........ *G06F 11/3692* (2013.01); *G06F 11/261* (2013.01); *G06F 11/28* (2013.01); *G06F 11/3612* (2013.01); *G06F 11/3664* (2013.01); *G06F 11/3688* (2013.01); *G06F 21/72* (2013.01)

(58) Field of Classification Search
None
See application file for complete search history.

(56) References Cited

U.S. PATENT DOCUMENTS

| 4,481,627 A * | 11/1984 | Beauchesne | ........... G11C 29/48 714/718 |
|---|---|---|---|
| 2003/0014703 A1* | 1/2003 | Chakravarthy | ............................. G01R 31/318307 714/726 |
| 2007/0033461 A1* | 2/2007 | Fagan | ............ G01R 31/318541 714/726 |

(Continued)

OTHER PUBLICATIONS

Botella, "Model-based Testing of Cryptographic Components Lessons Learned from Experience", 2013, 2013 IEEE Sixth International Conference on Software Testing, Verification and Validation (Year: 2013).*

(Continued)

*Primary Examiner* — Hossain M Morshed
(74) *Attorney, Agent, or Firm* — Pillsbury Winthrop Shaw Pittman LLP

(57) ABSTRACT

The method for validating the status of a memory of a simulator of a cryptographic component able to save data generated by a cryptographic function, includes a step carried out in the simulator including a first execution of a first cryptographic function generating: a first status of the first memory, and a first result of the first command; a step carried out in a test bench including a second execution of a second simplified cryptographic function, with the first and the second functions carrying out the same operations generating: a second status of the memory, and a second result of the second command; a step of validating including comparisons: of the first status and of the second status and of the first result and of the second result.

15 Claims, 1 Drawing Sheet

(56) References Cited

U.S. PATENT DOCUMENTS

| | | | |
|---|---|---|---|
| 2010/0262864 A1* | 10/2010 | Tsujido | G06F 11/27 714/32 |
| 2013/0066954 A1* | 3/2013 | Nagase | G06F 11/3604 709/203 |
| 2016/0371496 A1* | 12/2016 | Sell | G06F 9/45558 |
| 2017/0177467 A1* | 6/2017 | Prat | G06F 11/3664 |

OTHER PUBLICATIONS

Di Natale, G., et al., "A Reliable Architecture for the Advanced Encryption Standard," Proceedings of the 13$^{th}$ IEEE European Test Symposium, May 25, 2008, XP031281076, ISBN: 978-0-7695-3450-2, pp. 13-18.

* cited by examiner

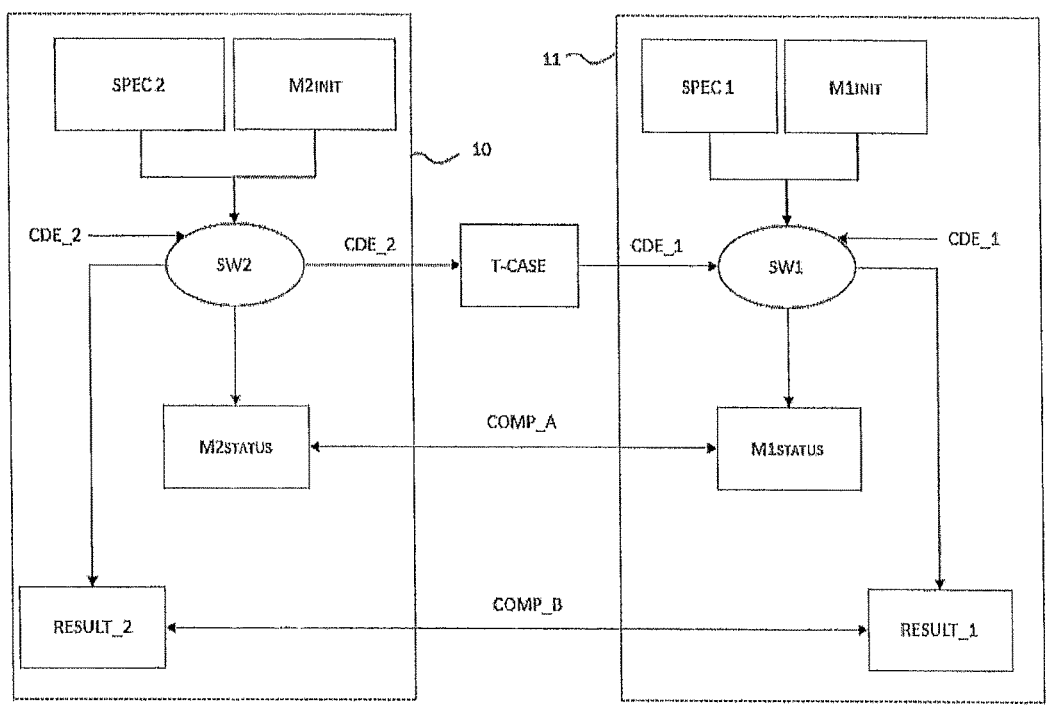

METHOD FOR VERIFYING THE FUNCTIONALITIES OF A SOFTWARE INTENDED TO BE INTEGRATED INTO A CRYPTOGRAPHIC COMPONENT, SYSTEM

CROSS-REFERENCE TO RELATED APPLICATION

This application claims priority to French Application No. 1562841, filed Dec. 18, 2015, the entire contents of which is incorporated herein by reference in its entirety.

FIELD

The field of the invention relates to the methods that make it possible to validate the status of a memory after the execution of an executable program when this program manipulates encrypted data. The validation of the memory makes it possible to judge the proper execution of a program. The field therefore relates to that of methods that allow for a verification of the proper operation of a computer program, also referred to as software, before it is put into production in a dedicated component.

PRIOR ART

Currently, when a program is compiled and stored in a physical memory, it is possible to validate its contents by comparing the status of the memory with an expected reference. This operation allows for a first verification before other verifications of the program for example by testing certain functions.

Certain tools such as debuggers allow for the step-by-step validation of a compiled program on a memory in order to test all of the executable functions.

However for programs that comprise cryptographic functions and/or which drive components that process encrypted data, access to the data saved by such functions or by such components is generally protected and it is not possible to read the contents of the memory in order to verify the proper execution of a function.

Furthermore, an operation aimed at comparing the status of the memory of a program with a reference status makes it possible to rapidly obtain status of the correct or incorrect operation of a function or of a component. However, when the component is a cryptographic component, access to the memory is practically impossible in light of the protective mechanisms that are naturally implemented to protect access to and the copying of the encrypted data of the component.

A cryptographic component allows for the execution of various functions by means of a software built into the cryptographic component. For example, a function makes it possible to process unencrypted data in order to encrypt it. In this framework, without access to the memory of the cryptographic component, the tests consisting in validating the proper operation of such a cryptographic component are difficult to implement. The main operations carried out by the cryptographic functions cannot be validated simply during debugging operations.

Consequently, as the memory of such a component is protected, access to the data saved in an encrypted memory requires testing the component when the latter is in an operational configuration. These operations result in additional costs and can be long.

In this framework, the simple operations of comparing the status of the memory are difficult to implement when the component is a cryptographic component.

There is no way to verify on a cryptographic component that the contents that have been written on the non-volatile memory are indeed compliant with expectations.

In light of the fact that it is practically impossible to "photograph" the memory of a cryptographic component in order to allow for the operation of debugging, a limitation in the methods of programming, testing and validating the execution of the program appears today in the technical solutions proposed.

SUMMARY OF THE INVENTION

The invention aims to overcome the aforementioned disadvantages.

An object of the invention relates to a method for validating the status of a memory of a simulator of a cryptographic component able to save data generated by at least one cryptographic function, characterised in that it comprises:

A first step carried out in the simulator comprising a first execution of at least one first cryptographic function using a first command of instructions by a first software implemented by a first processor and by means of a first memory, said first execution of at least one cryptographic function generating:
a first status of the first memory;
a first result of the first command;
a second step carried out in a test bench comprising a second execution of at least one second cryptographic function using a second command of instructions par a second software implemented by a second processor and by means of a second memory, with the first and the second functions carrying out the same operations modifying the status of their respective memory, said second execution of at least the second command generating:
a second status of the second memory;
a second result of the second command.
A step of validating comprising comparisons:
of the first status and of the second status;
of the first result and of the second result.

In other words this last step is a step of validation that compares, using a calculator:
the first status of the memory with the second status of the memory;
the first result with the second result.

According to an embodiment, a function for converting instructions of the first command of instructions generates the second command of instructions for the execution of a cryptographic function of the first software.

According to an embodiment, the function of converting instructions is carried out by the second software by means of the second processor.

An advantage is to make it possible to validate that the instructions defined in the commands of the test bench indeed correspond to the instructions that will be generated in the cryptographic component. Another advantage is to make it possible to launch the two functions of the first and of the second softwares SW1 and SW2 simultaneously. Another advantage is to save the operator from having to define a complex command in the environment of the simulator which is similar to that of a cryptographic component. The operator can then generate a complex command, for example in its formalism, using a simple command.

According to an embodiment, all of the cryptographic functions carried out by the first or the second software comprise at least one of the following functions:
An authentication function;
An encrypting or decrypting function;
A signature function or function for verifying a signature;
A function for calculating fingerprints;
A function for storing data;
A function for integrity calculations.

According to an embodiment, the status of a memory comprises the data saved in the memory after the execution of a command of instructions.

According to an embodiment, the status of a memory comprises all of the data present in the memory after the execution of a command of instructions.

According to an embodiment, the result of a cryptographic function executed by means of a command comprise the value returned by at least one calculation of a cryptographic function.

According to an embodiment, the result of a command comprises at least one of the pieces of data in the following list:
An acknowledgement indicating the success or failure of the execution of a cryptographic function;
Integrity data of the command;
A digital signature;
A calculation of the fingerprints of an encrypted or decrypted message;

According to an embodiment, each cryptographic function of the first software and of the second software comprises operations aimed at performing calculations on at least one value comprised in the input command instructions and at saving this value in a memory associated with the software.

According to an embodiment, each cryptographic function of the first software comprises:
a first set of operations having a first influence on the status of the memory, with the first influence being linked to a modification of the status of the memory;
a second set of operations having a second influence on at least one input and/or output of an interface of the first software, with the second influence being linked to the reading or the modification of data transiting over said interfaces;
a third set of operations that does not have any influence on the memory or on an input or output.

An advantage of segmenting the operations of each cryptographic function of the first software is to identify the operations that have an influence on the memory or the interfaces of the first software in order to establish the specifications of a second software that primarily implements the operations that have an influence on the memory or the interfaces of the software SW2.

According to an embodiment, each cryptographic function of the second software comprises the first and the second sets of operations.

An advantage is to allow for a reproducibility of the main operations of a cryptographic function that is to be tested while still controlling the operations that only have an influence on the memories M1 and M2.

According to an embodiment, each cryptographic function of the second software does not comprise the third set of operations.

An advantage is to make it possible to carry out a second software more economically and more simply.

The various embodiments of the invention can be combined in various alternative embodiments.

Another object of the invention relates to a system of tests of a software executing a set of cryptographic functions of a software intended to be integrated into a cryptographic component, characterised in that it comprises:
a simulator comprising a first processor for the execution of a first cryptographic function, a first memory recording a new status after the execution of the first cryptographic function, first interfaces in order to read an execution command of the first cryptographic function and return a value of the result of the execution of said function;
a test bench comprising a second processor for the execution of a second cryptographic function comprising operations carried out by the first cryptographic function executed in the simulator, with the first cryptographic function as such corresponding to the first cryptographic function executed in the environment of the test bench, a second memory recording a new status after the execution of the second cryptographic function, second interfaces for reading an execution command and for returning a value of the result of the execution of the second function;
a calculator making it possible to compare the statuses of the two memories at the end of the execution of the first and of the second function and making it possible to compare the values of the results of each function.

The system of the invention makes it possible to implement all of the steps of the method of the invention as well as all of the embodiments.

BRIEF DESCRIPTION OF THE FIGURES

Other characteristics and advantages of the invention shall appear when reading the following detailed description, in reference to the annexed figures, which show:
FIG. 1: a functional diagram of the main steps of the method of the invention.

DESCRIPTION

In this invention "cryptographic component" means a component that comprises a memory, inputs and outputs, a processor such as a microprocessor and carrying out cryptographic functions. The memory comprises a volatile memory such as a RAM and a non-volatile memory such as a Flash memory. The volatile memory erases its saved data each time the volatile memory is rebooted, The non-volatile memory saves the data stored during the various operations executed by the cryptographic functions, Among the cryptographic functions provided by a cryptographic component, there is for example:
an authentication function;
an encrypting or decrypting function;
a signature function or function for verifying a signature;
a function for calculating fingerprints;
a function for storing data;
a function for calculating a message authentication code, for example a MAC message.

This list is incomplete and is mentioned only as an example.

The method of the invention applies to any cryptographic component that imposes to preserve the status of the memory, i.e. its contents, with respect to a third part. Generally, the memory of a cryptographic component cannot be accessed. When it can be accessed, the data is encrypted and cannot be recovered "in clear" by a third party. The method of the invention makes it possible during the phases of testing and validating of the software of a cryptographic component to verify the proper operation of the software despite the non-accessibility of the status of the memory modified by the execution of a cryptographic function.

Each cryptographic function can be represented by a set of instructions making it possible, using input data, to generate output data such as for example an encrypted key. Certain instructions implement the input and the outputs of the component and/or the memory in such a way that the status of the memory or of the component is modified by the execution of these instructions. Other instructions do not modify the status of the memory or certain inputs or outputs of the cryptographic component.

A simulator in terms of this invention of a cryptographic component is carried out in order to test the main cryptographic functions that have an impact on the status of the memory of the component or its inputs and outputs. An advantage of using a simulator 11 is to be able to read the status of the memory M1 and to compare it with a status of memory M2 of a test bench 10 that reproduces the modifications of the status of the memory. The simulator 11 makes it possible to define the accesses to the memory M1 and to extract its contents in order to carry out comparison operations.

A first software SW1 is intended to be integrated into the cryptographic component. The first software SW1 makes it possible to carry out a set of cryptographic functions. The first software SW1 in order to be tested is integrated into a simulator.

According to an embodiment of the invention, when the first software SW1 is tested and validated, it is then integrated into a cryptographic component which is integrated into a communication device such as a mobile.

The inputs and outputs of the cryptographic component are reproduced in the simulator which makes it possible to test and validate the software SW1.

A second software SW2 is designed to reproduce simplified functions of the first software SW1. As such the second software SW2 reproduces the main cryptographic functions of the first software SW1 while still not reproducing certain treatments that are not necessary for validating cryptographic functions. Indeed, the first software SW1 comprises instructions that do not have any impact on the status of the memory or on the inputs and outputs.

The problem that the invention proposes to resolve is to define a test protocol, and therefore a method, that makes it possible to verify the proper operation of the first software SW1 of the component using in particular the second software SW2. The verifications can be carried out by means of comparisons of the statuses of the memories associated with each one of the softwares. The method of the invention therefore makes it possible to have a simple testing tool while still ensuring that the results of the tests are representative of the operational functioning of the first software SW1 in the cryptographic component.

The FIG. 1 shows a functional diagram of the method of the invention.

A first branch 10 shows the various elements for the implementing of the method of the invention in order to validate the first software SW1 which is intended to be integrated into a cryptographic component. To this effect, the branch 10 comprises a second software SW2 designed to:

generate a status of the memory $M2_{STATUS}$ after the execution of a cryptographic function of the first software SW1;

generate at least one result RESULT_2 of a cryptographic function of the second software SW2;

generate input commands T_CASE in accordance with the environment of the simulator of the branch 11 for the execution of a function of the first software SW1 corresponding to a function of the second software SW2.

The second software SW2 makes it possible to establish comparison parameters in order to validate the proper execution of cryptographic functions of the first software SW1.

The first software SW1 is validated in a simulator that comprises the various elements of the branch 11. A specification SPEC 1 makes it possible to describe the cryptographic functions of the first software SW1 that integrates all of the sub-functions required for the execution of each cryptographic function. Certain sub-functions have no influence on the status of the memory, others do not cause the intervention of parameters or values of inputs or outputs of the cryptographic components.

In this description sub-functions of a cryptographic function or operations of a cryptographic function are treated indifferently.

The second software SW2 is designed using a simplified functional specification SPEC 2 of the functional description SPEC 1 of the software SW1. The simplification of the specification SPEC 1 comprises for example the suppression of the sub-functions of a cryptographic function that do not affect the status of the memory M1 or that do not interact with the inputs and outputs of the cryptographic component.

The second software SW2 is able to reproduce the execution of the sub-functions of each cryptographic function that have in particular an influence on the status of the memory M1 or on the inputs and outputs of the cryptographic component. The second software SW2 therefore allows for the execution of at least one function resulting in the generation of a status of the memory $M2_{STATUS}$ and a result RESULT_2 of a function equivalent to the function of the first software SW1. An objective of the method of the invention is to compare the statuses of the memories $M1_{STATUS}$ and $M2_{STATUS}$ after the execution of the two functions in each one of the environments of the branches 10 and 11 and to compare the results RESULT_1 and RESULT_2 of these two functions.

The branch 10 can be understood as a test bench or a test platform or a test environment that makes it possible to validate the first software SW1. Once validated, the first software SW1 can then be put into production, which means: be integrated into a cryptographic component.

The elements of specification SPEC 1 and SPEC 2 respectively of the branch 11 and 10 are not necessarily included in the branches in that the specifications of the software SW1 and SW2 can be data that is independent of the execution of the method of the invention and can be used for the design of the softwares SW1 and SW2 upstream of the execution of the method.

The representation of the elements designating the specifications SPEC 1 and SPEC 2 allow for a better understanding of the invention in that it is understood that the second software SW2 is compiled independently from the first software SW1. This forms an advantage of the invention. Furthermore, the second software SW2 is a simplified version of the first software SW1 permitting to save design time. The means for validation of the branch 10 only treat sub-functions of a cryptographic function that have an influence on the memory or on the inputs and outputs of the simulator and therefore of the cryptographic component.

The specification SPEC 1 makes it possible to design the cryptographic functions of the first software SW1 for example by means of instructions of code in a given language. According to an embodiment, a portion of the hardware instructions HW can be coded in VHDL, a portion of the software instructions SW, in particular the algorithmic portion of the cryptographic functions, can be coded in the C language.

The method of this invention allows for the carrying out and the use of a second software SW2 designed in the same language as the first software SW1 or in another language. When the latter is designed in another language, an advantage is a certain flexibility in the design of the test platform 10. For example, using a language with less restrictions than the language used to code the first software SW1 can be chosen. By way of examples, basic function libraries can be used to reduce the design time of the second software SW2. Furthermore, a simpler or more accessible language can be used in such a way as to facilitate the handling of the second software SW2 or the development thereof.

In particular, it can be programmed in a less restrictive development environment. Furthermore, it can overcome the design parameters of the cryptographic component which impose an optimisation of the code generated. Finally, the second software SW2 can be designed by focussing on treating only the variables and the parameters linked to the cryptographic functions which cannot be the case of the first software SW1 which is tested in the simulator and which is intended to operate in the cryptographic component.

A memory M1 is represented in the branch 11 according to two configurations:

M$1_{INIT}$ represents the status of the memory M1 of the simulator before any execution of operations, i.e. at the initialisation of the method;

M$1_{STATUS}$ represents the status of the memory M1 of the simulator after one or several operations have been carried out, for example, through the execution of at least one cryptographic function.

The branch 10 represents a memory M2 or a representation of the memory M2. The memory M2 or its representation is represented according to two configurations:

M$2_{INIT}$ represents the status of the memory of the test bench or the theoretical value generated at the initialising of the method of the invention;

M$2_{STATUS}$ represents the status of the memory of the test bench or the value generated by the second software SW2 after one or more operations have been carried out, for example, by the execution of a cryptographic function by the second software SW2 corresponding to the function executed in the first software SW1.

The operations carried out by the second software SW2 are substantially operations that implement only the sub-functions of at least one cryptographic function having an influence on the memory M2 of the simulator or on the inputs and outputs of the simulator which are functionally identical to the inputs and outputs of the cryptographic component.

As an example, a cryptographic function can be a function for encrypting a digital key. In this case, input data of the second software SW2 can be defined using an interface via the definition of a value in clear, i.e. not encrypted, defining a digital key of a certain length.

The second software SW2 is capable of:

calculating the encrypted value of the key;

generating the data corresponding to the status of the memory M2 which can correspond to the encrypted value alone or to the encrypted value alone with other data to be stored in the memory, such as for example an identifier;

returning the result RESULT_2 of the function executed which can be for example an acknowledgement that indicates that the encryption is a success. Furthermore, this latter result can comprise a copy of the encrypted key for example, i.e. the result of the function called The key is encrypted and saved in the memory M2 when the second software SW2 executes the cryptographic function. Saving data in the memory M2 also means the generating of a value of the status of the memory M2 according to which the memory M2 is a dedicated physical component or a simple file. The status of the memory M2 is therefore modified after the execution of a cryptographic function, this status is noted as M$2_{STATUS}$ in branch 10.

Optionally, the method of the invention comprises an instruction conversion function, noted as T-CASE, in order to generate instructions CDE_1. The instructions CDE_1 are generated using a simple command CDE_2 intended for the second software SW2. An advantage of this conversion function is to generate an instruction CDE_1 that is compliant with the nomenclature of the instructions used in the cryptographic component and therefore in the simulator of the branch 11. Therefore, this function of converting a simple command CDE_2 into a set of instructions CDE_1 makes it possible to validate that the simple command CDE_2 is representative of the instructions that make it possible to activate the tested cryptographic function of the test bench of the branch 10 and of the input data required for the execution of at least one cryptographic function.

FIG. 1 shows a simple command CDE_2 that can be expressed simply by means of a user interface. The command CDE_2 makes it possible to activate the cryptographic function that is desired to be activated and makes it possible to define the input data of this function in the environment of the simulator of the branch 11.

A command can comprise an instruction or a set of instructions.

Moreover, the branch 11, representing the simulator and therefore the compliant behaviour of the first software SW1 such as will be in the cryptographic component, comprises an input for activating the cryptographic functions of the first software SW1, noted as CDE_1. The notation CDE_1 defines the command containing the instructions in order to execute a cryptographic function and it also defines the physical interface. This physical interface such as shown in FIG. 1 can be present in the simulator and/or come from an interface with the branch 10 by the intermediary of an instruction conversion function T-CASE.

The instructions of the command CDE_1 can be defined in a complex language and can integrate elements that are not required for the execution of a given cryptographic function in its environment. This latter case can for example occur when the same command makes it possible to execute several cryptographic functions simultaneously.

The method of the invention therefore makes it possible using the second software SW2 to generate a command CDE_1 in accordance with the execution of at least one cryptographic function of the first software SW1 in the environment of the simulator. This command CDE_1 is therefore generated using an instruction conversion functions that can be included in the second software SW2 or be integrated into a software and a dedicated component such as is shown in FIG. 1 by the component T-CASE. The physical component T-CASE also represents the instruction conversion function in such a way as to simplify the reading of the graph.

This component is able to read a command CDE_2 of the test bench and to interpret it in order to generate a command CDE_1 in accordance with the environment of the simulator. As such the two branches 10 and 11 can be used simultaneously using a single input command CDE_2 in such a way as to carry out in parallel the cryptographic functions of the first SW1 and of the second SW2 softwares that correspond.

The status of the memory $M2_{STATUS}$ can be generated using a calculation and be saved in a file or it can be written to a physical memory M2 of the test bench. Following the execution of a cryptographic function, the second software SW2 modifies the initial state $M2_{INIT}$ into a new status $M2_{STATUS}$.

The conception of the second software SW2 is advantageously coded using functional specifications that identical to those of the first software SW1 while still using for example another language or using another environment or using another person. This differentiation of the means of production of the first SW1 and of the second SW2 softwares makes it possible to guarantee that the same error is not reproduced in the softwares SW1 and SW2. Thanks to this differentiation in the design of the two softwares SW1 and SW2, the tests of the cryptographic functions are independent of a design error that would be identical in the first software SW1 and in the second software SW2.

Moreover, the step of generating instructions T-CASE makes it possible to test that the input instructions are indeed read in accordance with those that will be in the cryptographic component.

In such a way as to validate a cryptographic function of the first software SW1, the statuses of the memories $M1_{STATUS}$ and $M2_{STATUS}$ can be compared at the end of the execution of the cryptographic function tested by means of a comparison function noted as COMP_A. Furthermore, the results RESULT_1 and RESULT_2 of the functioned executed respectively by the softwares SW1 and SW2 can be compared by a comparison function COMP_B.

When the comparisons agree, a cryptographic function of the first software SW1 can be validated.

An advantage of the invention is to provide a method that makes it possible to validate the proper execution of a cryptographic function while no access to the status of the memory is possible.

An advantage of the invention is to make possible not only to verify that the results of the cryptographic functions executed respectively in the test bench 10 and in the simulator 11 correspond but also to make it possible to verify the integrity of the status of the modified memory $M1_{STATUS}$ by comparing it with the status of the memory $M2_{STATUS}$ respectively of the simulator and of the test bench. This last operation of comparing statuses of memories of the test bench 10 and of the simulator 11 makes it possible to verify that the impacts of the execution of a cryptographic function of the first software SW1 on the status of the memory M1 is identical to the impact of the execution of a cryptographic function of the second software SW2 on the memory M2.

Indeed, when a cryptographic function of the first software SW1 is executed, it can impact the related data of the memory M1 that is not directly generated by the cryptographic function. The method of the invention therefore makes it possible to ensure that the status of the memory indeed complies with the expectations by this operation of comparison of statuses $M1_{STATUS}$ and $M2_{STATUS}$.

The invention claimed is:

1. A method for validating operation of first software intended to be embedded in a cryptographic component using a simulator and a test bench which makes it possible to validate at least one first cryptographic function obviating at least some validation of the at least one first cryptographic function of the cryptographic component due to limited accessibility of the cryptographic component's memory, the method comprising:
a step carried out on a processor and comprises generation of a first command of instructions to be used in the simulator from a second command of instructions to be use in the test bench, wherein the second command activates a cryptographic function and defines input data of the first software:
a first step carried out in the simulator and comprising a first execution of the at least one first cryptographic function using a first command of instructions by the first software implemented by a first processor and by a first memory,
said first execution of the at least one first cryptographic function generating:
a first status of the first memory, said first status comprising data present in the first memory after execution of a command of instructions; and
a first result of the first command, the first result comprising a value returned by at least one calculation of the first cryptographic function;
a second step carried out in the test bench and comprising a second execution of at least one second cryptographic function using a second command of instructions by a second software implemented by a second processor and by a second memory, with the at least one first cryptographic function and the at least one second cryptographic function carrying out same operations of modifying statuses of their respective memory, wherein the second software is a simplified version of the first software and reproduces a set of cryptographic functions of the first software while excluding some functionality that does not impact the first memory' status and input/output of the first software,
said second execution of the at least one second cryptographic function generating:
a second status of the second memory, said second status comprising data present in the second memory after execution of a command of instructions; and
a second result of the second command, the second result comprising a value returned by at least one calculation of the second cryptographic function; and
a step of validation that compares using a calculator:
the first status of the first memory with the second status of the second memory; and
the first result with the second result
wherein the operation of the first software is validated, when the first status and the first result are respectively identical to the second status and the second result.

2. The method for validating operation according to claim 1, wherein a function for converting instructions of the first command of instructions generates the second command of instructions for the execution of a cryptographic function of the first software.

3. The method for validating operation according to claim 2, wherein the instruction conversion function is carried out by the second software by the second processor.

4. The method for validating operation according to claim 1, wherein the set of cryptographic functions carried out by the first software or the second software comprises at least one of the following functions:
- an authentication function;
- an encrypting or decrypting function;
- a signature function or function for verifying a signature;
- a function for calculating fingerprints;
- a function for storing data;
- a function of calculating message authentication code.

5. The method for validating operation as claimed in claim 1, wherein the first status or the second status respectively of the first memory or the second memory comprises, all data saved in the memory after the execution of the first command of instructions or the second command of instructions.

6. The method for validating operation as claimed in claim 1, wherein a result of a cryptographic function executed by a command comprises a value returned by at least one calculation of a cryptographic function.

7. The method for validating operation as claimed in claim 1, wherein the a result of a command comprises at least one of the pieces of data in the following list:
- an acknowledgement indicating the success or failure of the execution of a cryptographic function;
- an acknowledgement of an authentication function;
- a result of an encrypting or decrypting function;
- a digital signature;
- a result of a verification of a digital signature;
- a fingerprint;
- a result of a fingerprint verification;
- a message authentication code (MAC);
- a result of a verification of a message authentication code (MAC).

8. The method for validating operation as claimed in claim 1, wherein each cryptographic function of the first software and of the second software comprises operations aiming to perform calculations on at least one value comprised in an input command of instructions and to save the at least one value in a memory associated with the software.

9. The method for validating operation as claimed in claim 1, wherein each cryptographic function of the first software comprises:
- a first set of operations that has a first influence on the status of the memory, with the first influence being linked to a modification of the status of the memory;
- a second set of operations that has a second influence on at least one input and/or output of an interface of the first software, with the second influence being linked to the reading or to the modification of data transmitted over said interfaces;
- a third set of operations that does not have any influence on the first memory or on an input or an output.

10. The method for validating operation as claimed in claim 9, wherein each cryptographic function of the second software comprises the first and the second set of operations.

11. The method for validating operation as claimed in claim 9, wherein each cryptographic function of the second software does not comprise the third set of operations.

12. The method for validating operation as claimed in claim 1, wherein a development environment of the first software is different from a development environment of the second software.

13. The method for validating operation as claimed in claim 1, wherein a programming language used to develop the first software is different from a programming language used to develop the second software.

14. The method for validating operation as claimed in claim 1, wherein the first and/or second result comprises a copy of an encrypted key.

15. A system for testing first software comprising a set of cryptographic functions by executing the set of cryptographic functions of the first software, which is intended to be integrated into a cryptographic component, and by validating at least one first cryptographic function obviating at least some validation of the at least one first cryptographic function of the cryptographic component due to limited accessibility of the cryptographic component's memory, the system comprising:
- a second software, which is a simplified version of the first software and reproduces the set of cryptographic functions of the first software while excluding some functionality that does not impact the first memory's status and input/output of the first software;
- a first command of instructions to be used in a simulator, the first command being generated from a second command of instructions to be used in a test bench, wherein the second command activates a cryptographic function and defines input data of the first software;
- the simulator comprising:
  - a first processor for executing the first software including a first cryptographic function,
  - a first memory for recording a new status after the execution of the first cryptographic function, and
  - first interfaces for reading an execution command of the first software including the first cryptographic function and for returning a resulting value of the execution of said first cryptographic function;
- the test bench comprising:
  - a second processor for executing a second software including a second cryptographic function comprising operations carried out by the first cryptographic function executed in the simulator, with the first cryptographic function corresponding as such to the second cryptographic function executed in an environment of the test bench,
  - a second memory for recording a new status after the execution of the second cryptographic function, and
  - second interfaces for reading an execution command of the second software including the second cryptographic function and for returning a resulting value of the execution of the second cryptographic function;
- a calculator configured to compare the statuses of the first and second memories after executing the first and of second cryptographic functions so that the resulting values are to be compared to validate the first software.

* * * * *